United States Patent [19]

Iizumi

[11] 4,262,695
[45] Apr. 21, 1981

[54] FLOW RATE CONTROL VALVE

[75] Inventor: Tomomitsu Iizumi, Tokyo, Japan

[73] Assignee: Shoketsu Kinzoku Kogyo Kabushiki Kaisha, Tokyo, Japan

[21] Appl. No.: 77,154

[22] Filed: Sep. 19, 1979

Related U.S. Application Data

[63] Continuation of Ser. No. 827,813, Aug. 25, 1977, abandoned.

[30] Foreign Application Priority Data

Sep. 2, 1976 [JP] Japan ................................ 51-116999
Sep. 9, 1976 [JP] Japan ................................ 51-120527
Oct. 27, 1976 [JP] Japan ................................ 51-144310

[51] Int. Cl.³ ...................... F15B 11/04; F15B 13/042
[52] U.S. Cl. ..................................... 137/599; 91/443; 137/599.2
[58] Field of Search ................. 137/493, 493.7, 493.8, 137/493.9, 599, 599.2; 91/443, 447

[56] References Cited

U.S. PATENT DOCUMENTS

| | | | |
|---|---|---|---|
| 1,697,865 | 1/1929 | Hahn et al. | 137/599 |
| 2,499,262 | 2/1950 | Stoudt | 91/443 X |
| 2,501,483 | 3/1950 | Taylor | 91/443 X |
| 2,570,937 | 10/1951 | Gash | 137/493.8 |
| 3,010,435 | 11/1961 | Abrams | 91/443 |
| 3,213,886 | 10/1965 | Pearne | 91/443 |

Primary Examiner—Robert G. Nilson
Attorney, Agent, or Firm—Toren, McGeady & Stanger

[57] ABSTRACT

A flow rate control valve for use with an actuator, in which a fluid may be quickly discharged from a cylinder in the actuator on a return stroke of a piston which is slidingly fitted in the cylinder. The valve includes a casing defining a fluid inlet port and a fluid outlet port, a fluid passage interconnecting the two ports, a throttle valve for restricting the opening of the fluid passage, and a pressure-regulating valve which is adapted to be open at pressures over a given pressure level. In this flow rate control valve, the throttle valve and pressure adjusting valve may be combined into a composite valve. An externally adjustable pressure adjusting spring, resiliently biases the pressure regulating valve.

1 Claim, 8 Drawing Figures

FLOW RATE CONTROL VALVE

This is a Continuation of Application Ser. No. 827,813 filed Aug. 25, 1977, now abandoned.

BACKGROUND OF THE INVENTION (1) Field of the Invention

This invention relates to a flow-rate control valve, and more particularly to a flow rate control valve having a quick discharge valve.

(2) Description of the Prior Art

In an actuator, fluid pressure is applied to a piston which is slidingly fitted in a cylinder, so that the piston is displaced within the cylinder and the displacement of the piston is derived as useful work through the medium of a rod secured to the piston. In this case, the output of the cylinder is dependent on the pressure (in general, pressure in a headside chamber in the cylinder with respect to the piston) applied to the piston for the desired work. The pressure required for returning the piston to its initial position (pressure on the rod-side chamber in the cylinder) should not necessarily be the same as that required for performing the work, i.e., it should be minimized to effect a piston return to its initial position. However, it has been the general practice that, after a pressure has been adjusted by means of a pressure regulating valve, a pressure at the same pressure level is applied to the head-side and rod-side chambers in the cylinder via a direction changeover valve, so that energy is wasted in returning the piston to its initial position, i.e., on its return stroke.

It is an object of the present invention to provide a flow rate control valve having a quick discharge valve, in which a working pressure is quickly applied to a cylinder so as to drive the cylinder on the advance stroke of a piston, and to quickly discharge pressure therefrom when pressure is to be discharged from the cylinder on its return stroke.

SUMMARY OF THE INVENTION

According to the present invention, there is provided a control valve including: casing defining a fluid inlet port and a fluid outlet port and a passage interconnecting the inlet and outlet; a throttle valve for restricting the passage provided in the casing; and a pressure regulating valve which is adapted to be open at pressures over a given pressure level.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
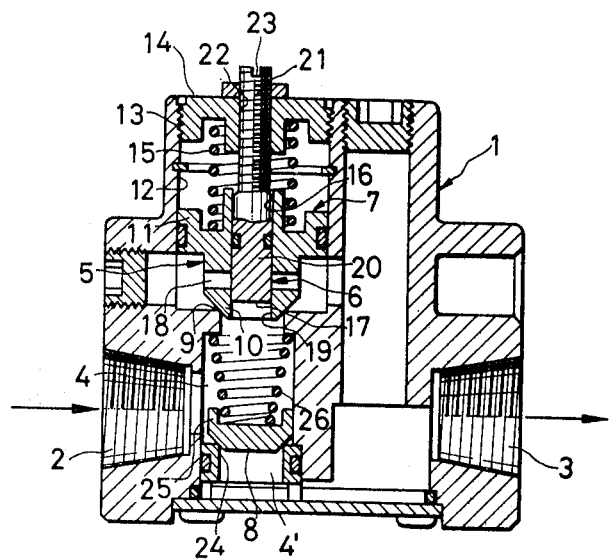
FIG. 1 is a vertical cross-sectional view of the flow rate control valve according to the first embodiment of the invention.
Figure 2:
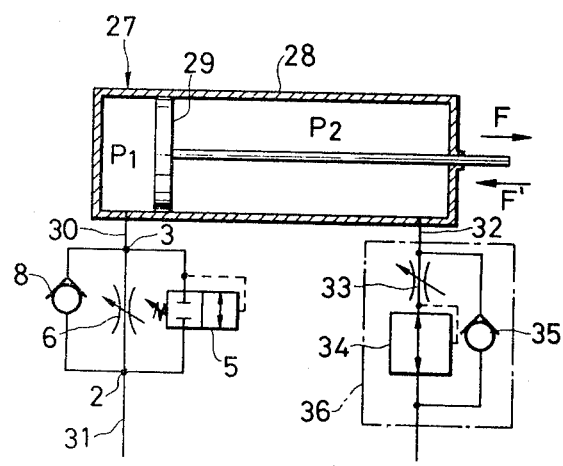
FIG. 2 is a diagram showing one embodiment of a fluid circuit incorporating the control valve according to the present invention.
Figure 3:
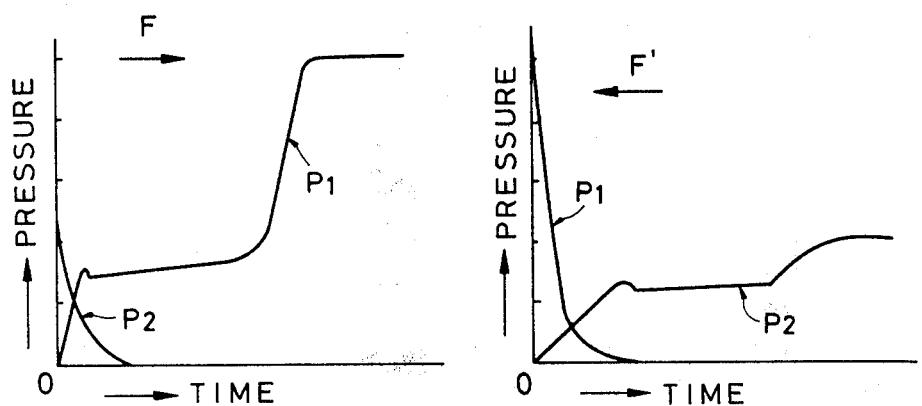
FIG. 3 are plots illustrative of the relationship between the pressure and the time in a fluid circuit of FIG. 2.

A flow rate control valve according to the first embodiment of FIGS. 1 through 3 includes an inlet 2 and an outlet 3 provided in a casing of a valve. The fluid passage 4 interconnects the inlet 2 and outlet 3. Positioned in the fluid passage is a composite valve 7 consisting of a two-port, two-position changeover valve 5 of a spring-offset-pilot type, and a needle valve 6 serving as a throttle valve. Positioned in parallel with the composite valve 7 is a quick discharge valve or check valve 8 adapted to allow the flow of fluid only in the direction from the outlet 3 to the inlet 2.

The composite valve 7 and the check valve 8 will be described in more detail hereinafter.

Referring first to the composite valve 7, a valve body 10 is adapted to be seated on a valve seat 9 forming part of the casing 1, while a piston or partition wall 11 is integral with the valve body 10 and slidingly fitted in a cylindrical wall 12 in air-and-water tight relation. The cylindrical wall 12 also forms part of the casing 1. A plug member 14 is threaded into an internally-threaded, cylindrical wall 13 continuous with the cylindrical wall 12, while a spring 15 is confined between the plug member 14 and the piston 11. In the two-port, two-position changeover valve 5, a pilot pressure is applied through the output 3 to the piston or partition wall 11, so that the valve body 10 is detached from the valve seat 9, thereby opening the fluid passage 4. The needle valve 6 is slidingly placed in a bore 16 extending through the center portions of the valve body 10 and the piston 11 integral therewith. A tip portion 17 of the needle valve restricts the opening of a transverse passage 18 provided in the valve body 10, as well as an opening 19 of the bore 16, which is open from the tip of the valve body 10. A needle 20 is formed with a rear, threaded portion 21, which is threaded into a screw hole 22 provided in the plug member 14, with the outer end of the portion 21 protruding from the plug member 14 externally. A slot 23 is provided in the outer end of the threaded portion 21 for receiving the tip of a screw driver.

The check valve 8 is adapted to open a fluid passage 4' only in the direction from the outlet 3 to the inlet 2. The fluid passage 4' is provided in the casing 1 in parallel with the passage 4 running through the composite valve 7. The check valve 8 consists of a valve seat 24, a valve body 25 adapted to be seated on the valve seat 24, and a spring 26 for resiliently urging the valve body 25 against the valve seat 24.

The outlet 3 as seen from FIG. 2 is connected through a line 30 to a head-side chamber in a cylinder 28 of an actuator 27 having a piston 29 fitted in the cylinder 28, while the inlet 2 thereof is connected via a line 31 to a direction-changeover valve (not shown). Provided on a line 32 leading from the rod-side chamber in the cylinder 28 is a valve means 36 consisting of a variable throttle valve 33, a pilot pressure reducing valve 34, and a check valve 35 positioned in parallel with the valves 33, 34. FIG. 3 shows the relationship between the movements of the piston within cylinder 28 in both the F and F' directions, and the pressures P1 and P2, wherein P1 represents the pressure prevailing in the head-side chamber in the cylinder 28, while P2 represents a pressure on the rod-side chamber in the cylinder 28.

A fluid at a flow rate, which is controlled by means of the aforesaid composite valve 7, is supplied to the head-side chamber in the cylinder 28 of the actuator. In this respect, the fluid may be quickly discharged through a check valve 35 from a rod-side chamber in the cylinder 28. Unlike the situation involving movement of the piston 29 in the arrow direction F, when fluid is supplied via a line 32 so as to cause the movement of the piston in an arrow direction F', fluid may be quickly discharged via the check valve 8. The flow rate of a fluid to cause the movement of the piston in the arrow direction F may be varied as required, by adjusting a force of the spring 15 by turning the plug member 14, as well as by adjusting an opening of the needle valve 6 due to the rotation of the threaded portion 21 of the needle 20 relative to the screw hole 22.

Figure 4:
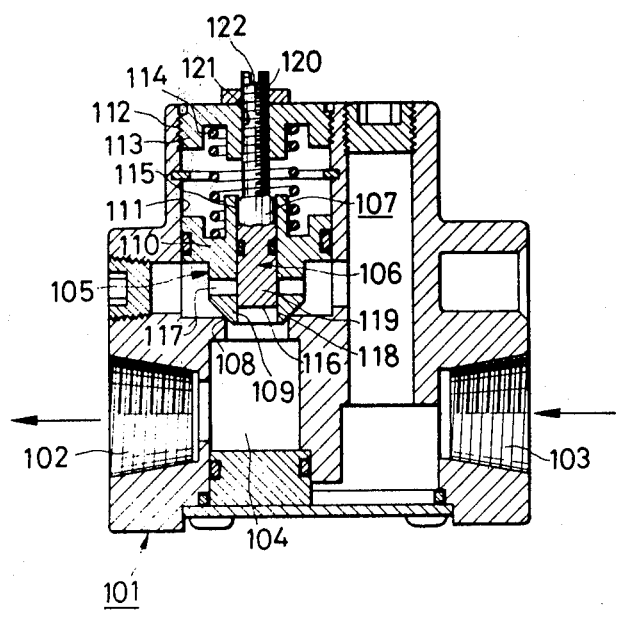
FIG. 4 is a vertical cross-sectional view of the flow rate control valve according to the second embodiment of the invention.
Figure 6:
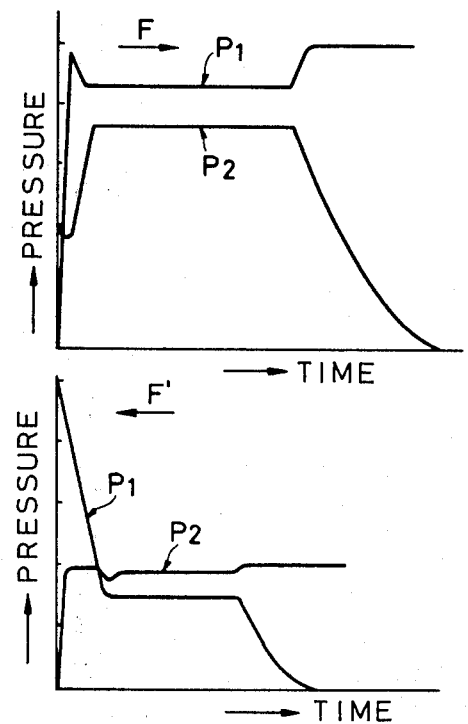
FIG. 6 are plots illustrative of the relationship between the pressure and the time in the fluid circuit of FIG. 5.

Referring to the second embodiment shown in FIGS. 4 and 6, a casing 101 is provided with an inlet 103, and an outlet 102, while a fluid passage 104 interconnects the inlet and outlet 103, 102. Provided on the fluid passage 104 is a composite valve 107 consisting of a spring-offset-pilot type, two-port, two-position changeover valve 105 serving as a flow rate control valve, and a needle valve 106 serving as a throttle valve. A valve body 109 of composite valve 107 is adapted to be seated on a valve seat 108 defined by the casing 101, and integrally formed with a piston or partition wall 110. The piston or partition wall 110 is slidingly fitted in a cylindrical wall 111 defined by the casing 101. A plug member 113 is threadedly fitted in an internally threaded wall 112 extending from the cylindrical wall 111. A spring 114 is confined between the piston or partition wall 110 and the plug member 113. In the aforesaid two-port, two-position changeover valve 105, pressure on the side of inlet 103 is applied as a pilot pressure to the piston or partition wall 110, thereby biasing the valve body 109 against the action of the spring 114, so that the valve body 109 may be detached from the valve seat 108, and thus the passage 104 may be opened. A needle 119 is slidingly fitted in a bore 115 extending through the central portions of the valve body 109 and piston or partition wall 110. The tip of the needle 119 adjusts the opening of a transverse hole 117, as well as an opening 118 which extends from the bore 115. A rear portion of the needle 119 is threaded at 120, and the threaded portion 120 is threaded into a screw hole 121 defined in the plug member 113, with the outer end of the threaded portion 120 being exposed externally. A slot 122 is provided in the end of the threaded portion 120 and adapted to receive the tip of a screwdriver.

Figure 5:
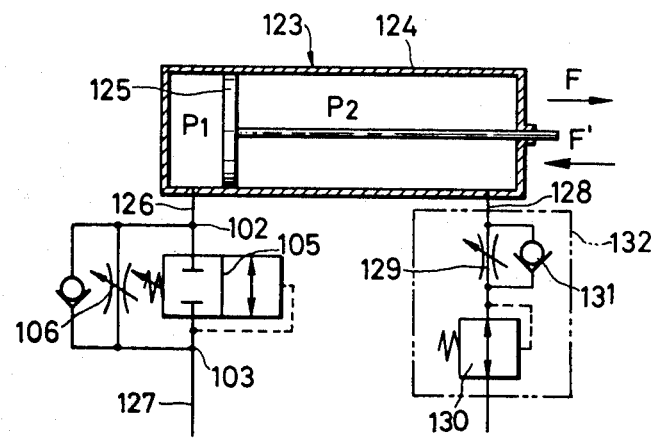
FIG. 5 is a diagram of the fluid circuit incorporating the flow rate control valve of FIG. 4.

As shown in FIG. 5, the outlet 102 of the flow rate control valve of the aforesaid arrangement is connected to a line 126 leading to the headside chamber in the cylinder 124 of actuator 123 with respect to the piston 125 which partitions the interior of the cylinder 124 into two chambers, while the inlet 103 thereof is connected to a line 127 leading to a changeover valve (not shown). On the other side, provided on a fluid line 128 leading to a rod-side chamber in the cylinder 124 is a valve means 132 consisting of a variable throttle valve 129, a pilot type pressure reducing valve 130, and a check valve 131 arranged in parallel with the variable throttle valve 129, FIG. 6 shows the relationship between the movements of the piston within the cylinder 124 in both the F and F' directions, and pressures P1 and P2. P1 and P2 represent pressures in the head-side and rod-side chambers in the cylinder 124, respectively.

A pressure is supplied to the head-side chamber in the cylinder 124 of the actuator 123 in the following manner. A pressure of a high level is supplied from a direction changeover valve (not shown) to the piston or partition wall 110, so that the piston or the partition wall 110 is biased upwardly, and the valve body 109 is detached from the valve seat 108. As a result, pressure is quickly supplied into the cylinder 124, thereby driving the piston 125. A fluid is discharged from a rod-side chamber under the control of the variable throttle valve 129. Unlike the movement of the piston 125 in an arrow direction F, when fluid is applied via the 128 to move the piston 125 in an arrow direction F', the pressure on the side of the direction changeover valve is lowered as compared with a set pressure level for the valve body 109, so that the valve body 109 is seated on the valve seat 108, thereby fully closing the opening or clearance therebetween. Pressure in the cylinder 124 is slowly discharged through a clearance defined between the valve body 109 and the needle 119, so that the speed of the piston 125 is controlled due to the adjustment of an opening of the needle valve 119.

Figure 7:
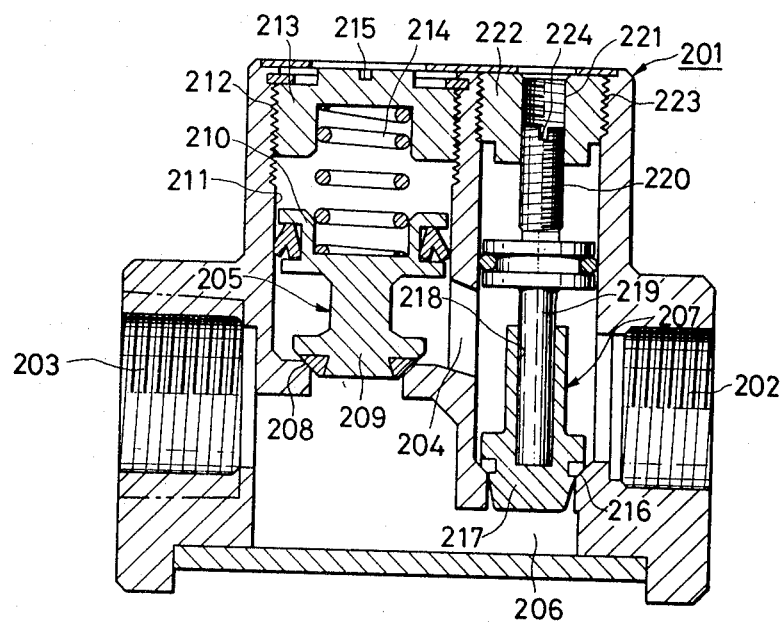
FIG. 7 is a vertical cross-sectional view of the flow rate control valve according to the third embodiment of the invention.
Figure 8:
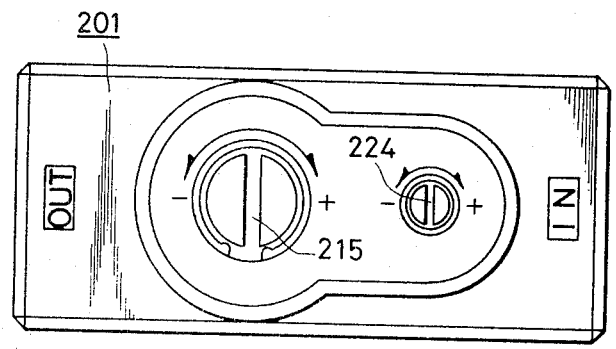
FIG. 8 is a plan view of the control valve of FIG. 8.

FIGS. 7 and 8 show the third embodiment of the control valve according to the present invention.

Shown at 201 in FIG. 7 is a body which is provided with ports 202, 203. A fluid passage 204 interconnects the ports 202 and 203. A pressure control valve 205 is provided on the fluid passage 204, while a flow rate control valve 207 is provided on a fluid passage 206 arranged in parallel with the fluid passage 204. A valve body 109 of pressure control valve 205 is adapted to be seated on a valve seat 208 defined by casing 201, while a piston or partition wall 210 is integral with the valve body 209. The piston or partition wall 210 is slidingly fitted in air-and-water tight relation in a cylindrical wall 211 which is also part of the casing 201. A pressure adjusting member 213 is threaded into an internally threaded wall 212 extending from the cylindrical wall 211. A pressure adjusting spring 214 is confined between the pressure adjusting member 213 and the piston or partition wall 210.

A pressure on the side of port 202 is applied as a pilot pressure to the piston or partitiona wall 210 as to bias the valve body 209 against the action of the pressure-adjusting spring 214, and thus the valve body 209 may be detached from the valve seat 208 for opening the fluid passage 204. A force of the pressure adjusting spring 214 is adjusted by rotating a screw driver, with the tip therefore fitted in a slot 215 provided in the end face of the pressure adjusting member 213.

A flow rate control valve 207 is provided in the fluid passage 206 which is arranged in parallel with the fluid passage 204. The flow rate control valve 207 consists of a valve seat 216 positioned on the fluid passage 206, and a valve body 217 adapted to be seated on the valve seat 216, with a stem 219 loosely fitted in a bore 218 provided in the valve body 217. The stem 219 is formed with a threaded end portion having threads 220. Internally threaded cylinder 222 has internal threads 221, which engage the threads 220. The internally-threaded cylinder 222 is fitted in the threaded surface 223 provided in the casing 210. A slot 224 is provided in the end face of the stem 219, and the tip of a screw driver is adapted to be fitted in the slot 224. Rotation of a screw driver causes stem 219 to advance so as to bias the valve body 217, thereby adjusting a clearance between the valve body 217 and the valve seat 216.

In the flow rate control valve having a quick discharge valve, when a primary-side pressure is supplied through the port 202 into the casing 201, with pressure of the fluid being maintained over a pressure level set by the adjusting spring 214, then fluid flows through a clearance between the valve body 209 and the valve seat 208 into the port 203. In case the aforesaid pressure is lowered as compared with a pressure level set by the pressure adjusting spring 214, then the valve body 209 is urged against the valve seat through the piston or partition wall 211, thereby shutting off fluid flow.

In case fluid flows from the port 203 to the port 202, then the fluid averts the pressure adjusting valve 205 but passes through the passage 206, and then through a clearance defined between the valve body 217 and the valve seat 216 in the flow rate control valve 207.

According to the present invention, by inserting a screw tip of driver in the slot 224, the pressure setting and flow rate adjustment may be effected with ease.

While specific embodiments of the invention have been shown and described in detail to illustrate the application of the inventive principles, it will be understood that the invention may be embodied otherwise without departing from such principles.

What is claimed is:

1. A fluid flow rate control valve for effecting fluid flow therethrough in two directions comprising: means defining a first port; means defining a second port; means defining a first fluid flow passage and a second fluid flow passage extending as parallel fluid flow paths between said first port and said second port; pressure adjusting valve means responsive to pressure at said first port for affecting regulated pressure fluid flow from said first port to said second port through said first flow passage; said pressure adjusting valve means including pressure adjusting means for adjusting the pressure at which said pressure adjusting valve means open to effect said fluid flow from said first port to said second port; and throttle valve means responsive to pressure at said second port for effecting reverse fluid flow from said second port to said first port through said second flow passage; said pressure adjusting valve means being structured to include valve seat means and a valve seat means engaging portion closing said first fluid flow passage when in engagement with each other, with said pressure adjusting means operating to urge said valve seat means engaging portion toward the closed position, and surface means located within said first fluid flow passage on the side of said valve seat means toward said first port; said surface means being exposed to pressure at said first port to unseat said valve seat means engaging portion when the force applied thereto exceeds the force of said pressure adjusting means urging said valve seat means engaging portion toward the closed position; said pressure adjusting valve means and said throttle valve means being structurally incorporated with each other to form a composite valve assembly, said pressure adjusting valve means including a valve body formed as a piston and said throttle means being formed by a needle valve body extending centrally through said piston within an opening therein, said needle valve body being adjustable in position to define a throttling opening through which said reverse fluid flow occurs.

* * * * *